July 3, 1956

J. H. WEAVING ET AL 2,753,024

HYDRAULICALLY OPERATED CLUTCH AND GEAR
CHANGE MECHANISMS FOR AUTOMOBILES

Filed Feb. 9, 1953

Inventors
John H. Weaving
Eric R. Payne
Duncan J. K. Stuart
By Scrivener and Parker
Attorneys July 3, 1956   J. H. WEAVING ET AL   2,753,024
HYDRAULICALLY OPERATED CLUTCH AND GEAR
CHANGE MECHANISMS FOR AUTOMOBILES
Filed Feb. 9, 1953   5 Sheets-Sheet 2

Inventors
John N. Weaving
Eric R. Payne
Duncan J. K. Stewart
By Scrivener and Parker
Attorneys

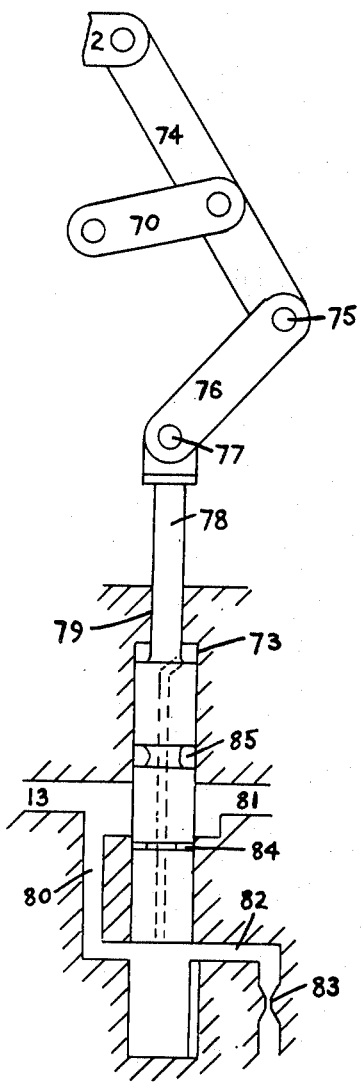
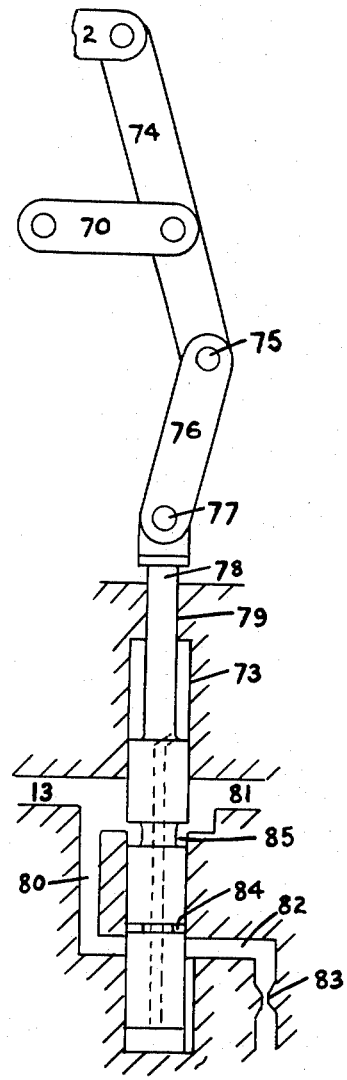

July 3, 1956    J. H. WEAVING ET AL    2,753,024
HYDRAULICALLY OPERATED CLUTCH AND GEAR
CHANGE MECHANISMS FOR AUTOMOBILES
Filed Feb. 9, 1953    5 Sheets-Sheet 5

Inventors
John Harold Weaving
Eric Richard Payne
Duncan J. K. Stuart
By Scrivner + Parker
attorneys

United States Patent Office 2,753,024
Patented July 3, 1956

2,753,024

HYDRAULICALLY OPERATED CLUTCH AND GEAR CHANGE MECHANISMS FOR AUTOMOBILES

John H. Weaving, Moseley, Birmingham, Eric R. Payne, Kings Heath, Birmingham, and Duncan J. K. Stuart, Northfield, Birmingham, England, assignors to The Austin Motor Company Limited, Birmingham, England Application February 9, 1953, Serial No. 335,802

Claims priority, application Great Britain February 12, 1952

6 Claims. (Cl. 192—3.5)

This invention relates to hydraulically operated clutch and gear change mechanisms for automobiles and of the kind in which a friction type clutch requires to be disengaged automatically by hydraulic means throughout the gear shifting operation.

With hydraulically operated clutch and gear change mechanisms hitherto proposed, it has been difficult to ensure that the clutch will be maintained disengaged during gear shifting without the use of complicated cam arrangements in the form of mechanical interlocking devices between the clutch and gear shift movements.

In a clutch and gear change mechanism according to the present invention, gear shifting movements of an initiating control are transmitted to a hydraulic selector valve which normally controls the flow of hydraulic fluid to and from a fluid pressure cylinder the piston of which moves the appropriate selector fork to effect engagement of the selected gears, a second hydraulic valve controls the flow of hydraulic fluid to and from a fluid pressure cylinder the piston of which operates the clutch, and the precise interlocking of the clutch and gear shift movements is ensured mainly by a third hydraulic valve the action of which prevents selector valve control of the gear shift cylinder until the clutch is fully disengaged.

The invention will now be described with reference to the accompanying drawings wherein similar reference characters refer to similar parts throughout the several views.

Figs. 9–11 are views of this alternative linkage and valve in various significant positions.

Figure 1:
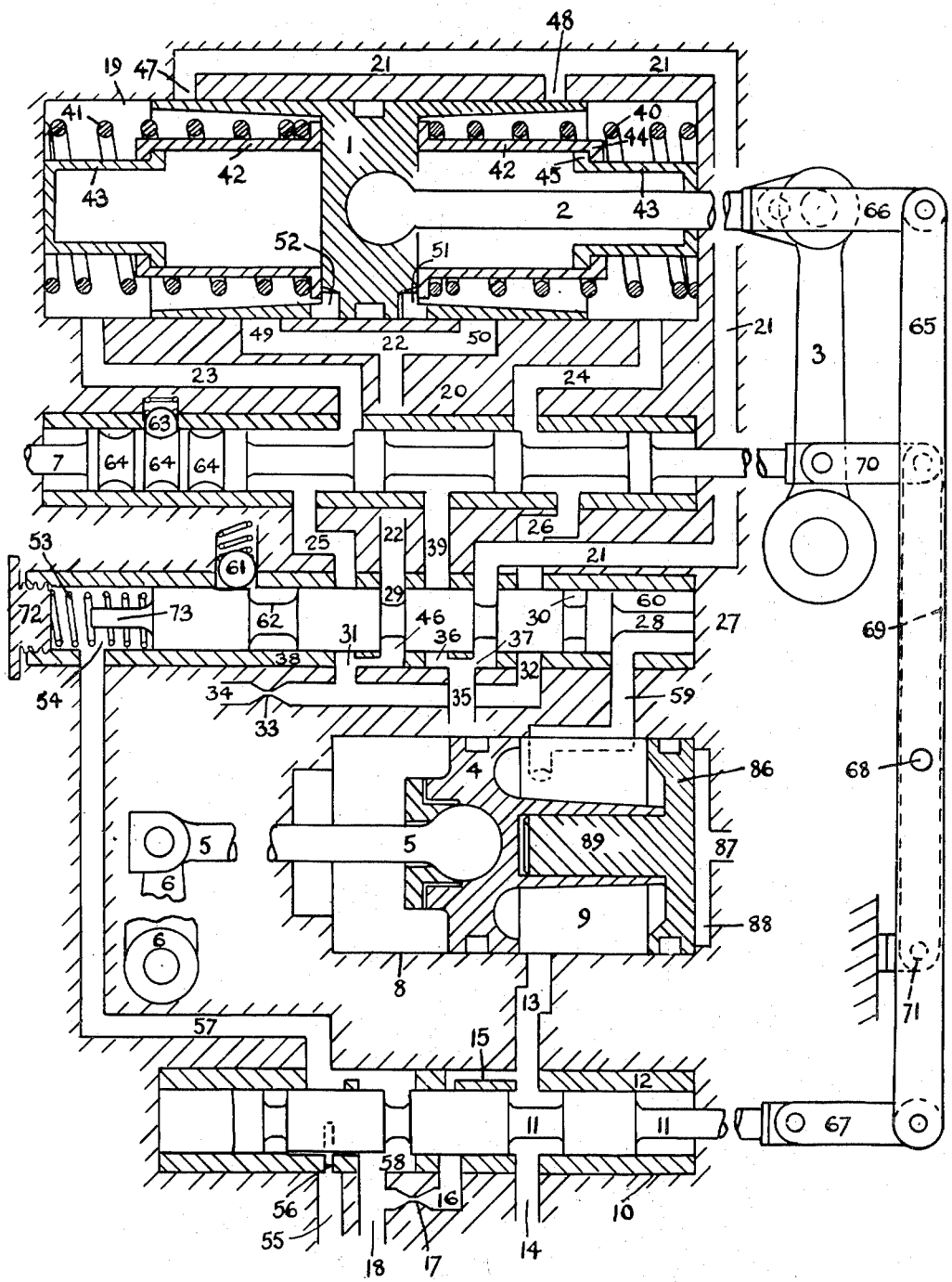
Fig. 1 is a diagrammatic representation of an automotive gear and clutch mechanism arranged in accordance with the principles of the present invention.

Referring in detail to Fig. 1, the invention as illustrated is arranged so that the movement of a double acting piston 1 is transmitted through a ball ended rod 2 to the forked end of a lever 3 this latter being externally mounted on an automotive gearbox in which the gears require to be engaged or disengaged by linear or rotative movements. The lever 3 operates, within the gearbox, these gear engaging and disengaging movements either by means of selector rods or otherwise.

The motions of a second piston 4 is transmitted through the ball ended rod 5 to operate through lever 6, externally mounted on the gearbox the engagement and disengagement of a friction type clutch normally spring loaded for engagement.

The control which initiates the clutch and gear shift operations may be driver operated control, or the invention may be applied to fully automatic systems incorporating speed and torque sensitive devices to initiate the clutch and gear changing operations.

Figure 12:
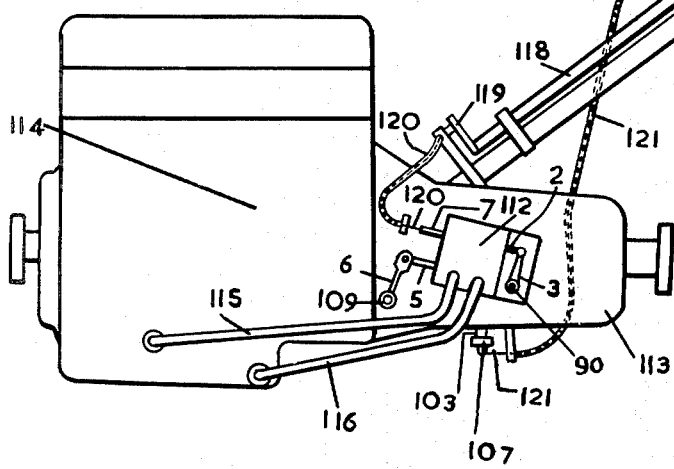
Fig. 12 is a diagrammatic representation of the gear and clutch mechanism of the present invention showing its relationship to other parts of an actual automobile.

In an embodiment of the invention as applied to a system in which the initiating control is driver operated and in which a continuous supply of hydraulic fluid under pressure is supplied by a pump driven say by the engine, the driver operated control may conveniently be in the form of a change speed lever mounted on the steering column, having up and down movement in a neutral plane radial to the column for engaging the appropriate selector rod in the gearbox and turning movement about the axis of the column in parallel planes, this latter movement being translated into axial movement of the hydraulic valve (the selector valve). Fig. 12 shows diagrammatically the mechanism mounted to the gearbox and the control linkage for it.

The mechanism 112 is attached to the gearbox and clutch operating shafts in the manner shown in Fig. 12. Fig. 12 also shows the gearbox mounted on the engine 114. Fluid under pressure from an engine driven pump is supplied to ports 14, 55 and 35 (Fig. 1) by pipe 115. Exhaust fluid from exhaust ports 18 and 34 is returned to the engine sump by pipe 116.

Figure 13:
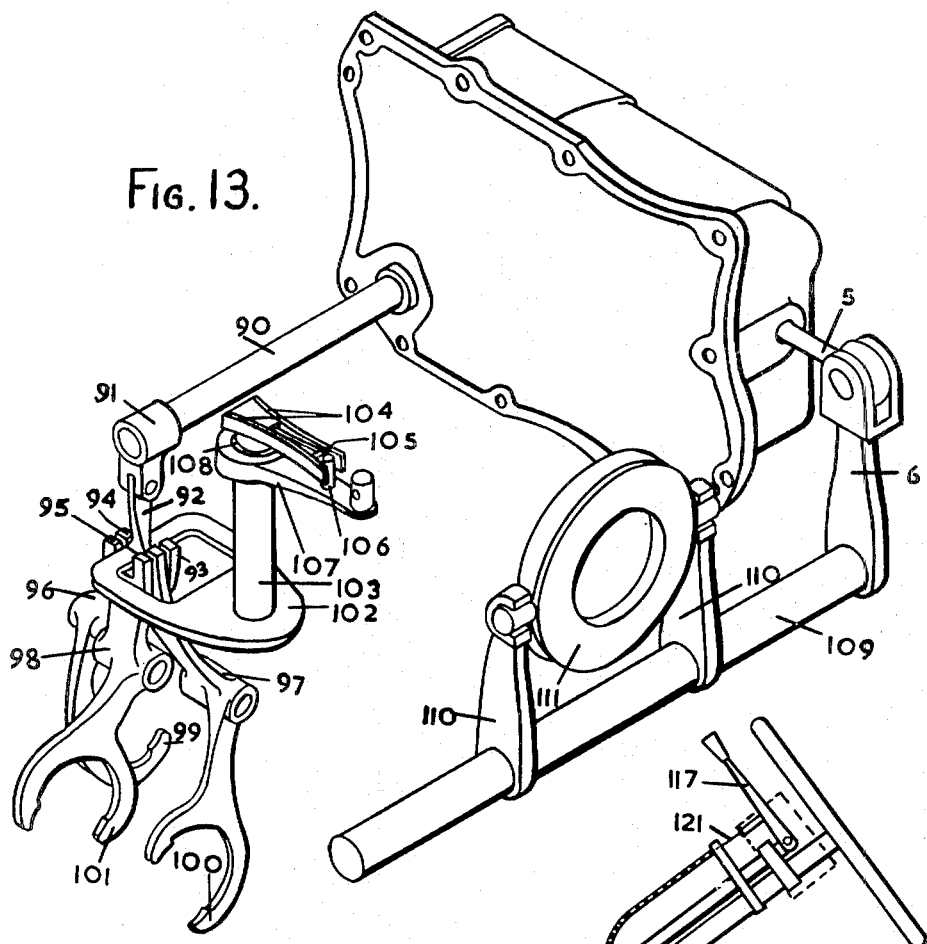
Fig. 13 is a perspective diagrammatic view illustrating the relationship between the gear and clutch mechanism of the present invention and the actual clutch and gear-change forks actuated thereby.

The steering column control lever 117 mounted on shaft 118, can be moved to three positions, both radially and laterally. The radial movement turns shaft 118 which turns lever 119 operating flexible cable 120, attached at its other end to the selector valve 7 (Fig. 1). Thus the three radial positions of the steering column lever 117 correspond to the three positions of the selector valve 7 controlled by ball 63 in the grooves 64 (Fig. 1). The lateral movement of the steering column lever 117 operates cable 121 which is connected to lever 107 (Fig. 12) and in turn to guide plate 102 (Fig. 13). The three lateral positions of lever 117 correspond to the three positions of lever 92 (Fig. 13) in the forks 93, 94 and 95. A "gate" mechanism (not shown) maintains the steering column lever 117 in its correct positions.

Referring now to Fig. 13, a rotatable shaft 90 mounted with the gearbox casing has attached lever 3 and collar 91 to which is also attached lever 92 through a pivoted connection. Lever 3 is as shown in Fig. 1, and is rotated by the movement of the gearshift piston 1 through ball ended rod 2. The end of lever 92 is formed into a lug engaging at one time one of three forks 93, 94 and 95, themselves integral with cranked members 96, 97 and 98, having bores slidable on rods (not shown) and large forked ends 99, 100 and 101. These three cranked members are the normal selector forks of a four-speed and reverse constant mesh type gearbox. The large forks 99, 100 and 101, caused by the rotation of the shaft 90, and lever 92, engaged in one of the three forks 93, 94 and 95, result in engagement of dog clutches, thus engaging the various ratios of the gearbox. The particular cranked member moved by lever 92 is determined by the position of guide plate 102, and hence the position of lever 92. Guide plate 102 is attached to shaft 103 at the other end of which are attached lamina pre-stressed springs 104 restrained in a central position by stop 105. Fitting closely between the lamina springs 104 is peg 106 attached to lever 107 which fits round bush 108 on shaft 103. When all three cranked members 96, 97 and 98 are in the neutral position, and lever 107 is turned, peg 106 pushes against either of the pre-stressed lamina springs 104 thus turning shaft 103 and guide plate 102 which will cause lever 92 to pivot on collar 91 and allow its lug to engage in any of the forks 93, 94 or 95. When one gear ratio is engaged, that is when one of the forked members is linearly misplaced, lever 92 is restrained from pivoting on collar 91 and the guide plate 102 is restrained from movement by the prong of the fork (either 93, 94 or 95) which has moved. Thus when a gear ratio is engaged and lever 107 is turned on shaft 103 peg 106 deflects one of the lamina springs 104 thus causing guide plate 102 to press against that member which restricts its movement; this it does until shaft 90, collar 91 and lever 92 return to the neutral position, when the deflected lamina spring will turn shaft 103 and guide plate 102 so pivoting lever 92 on collar 91 moving the lug into position predetermined by the original movement of lever 107. This laminated spring mechanism enables the predetermination of the particular cranked member 96, 97 or 98 to be moved following the return of the lever 92 and shaft 90 to the neutral position.

Fig. 13 shows ball ended rod 5 shown in Fig. 1 which is connected to the clutch actuating lever 6 mounted on shaft 109. Also mounted on shaft 109 are levers 110 which in turn are connected to clutch release bearing 111. When fluid under pressure enters clutch cylinder 9 and moves piston 4 and rod 5 (Fig. 1) shaft 109 is turned by lever 6, which causes levers 110 to move release bearing 111 hence depressing the clutch release mechanism (not shown) and disengaging this clutch.

Movement of the clutch piston 4 within the cylinder 8 is initiated by the flow of hydraulic fluid into and out of the space 9 within the cylinder. The flow of fluid to or from space 9 in cylinder 8 is controlled by clutch valve 10 consisting of spindle 11 and sleeve 12 and this flow is transmitted between valve 10 and cylinder 8 by means of transfer port 13. Hydraulic fluid under pressure enters the system through port 14 and, with the valve 11 in the position shown, port 14 is open to port 13 and the pressurised fluid is admitted to chamber or space 9 causing piston 4, rod 5 and lever 6 to move to the left against the spring pressure of the clutch, thereby disengaging the clutch. Valve spindle 11 is shown in its central position, and in either of the extreme end positions of its travel port 14 is cut off by a land on the valve spindle and port 15 which is directly connected with port 13 is simultaneously opened to exhaust across the valve and through port 16, throttle valve 17 and port 18.

Flow of fluid to and from both sides of gear shift piston 1, working within cylinder 19, is controlled either by the selector valve 20 or by the holding lines 21 and 22. During an actual gearshift the selector valve 20 is operative. In the central position of the selector valve spindle 7 as shown passages 23 and 24 connected respectively to opposite ends of cylinder 19 are open, across the valve, to passages 25 and 26 respectively. Passages 25 and 26 are also controlled by interlock valve 27 and, in the position shown, lands on interlock valve spindle 28 are blocking ports 25 and 26. During an actual gearshift spindle 28 has moved over to the left so as to bring grooves 29 and 30 opposite passages 25 and 26 thereby opening these passages through ports 31 and 32 and also through throttle valve 33 to exhaust port 34. Pressurised fluid to operate the gear shift piston enters from the pump through passage 35 which connects with ports 36 and 37 in sleeve 38 of interlock valve 27. When interlock valve spindle 28 is moved to the left port 36 is connected through a port in sleeve 38 to passage 39 and pressurised fluid flows through ports 35, 36 and 39 to selector valve 20. With selector valve spindle 7 in the central position as shown, this flow is effectively blanked off by the lands on selector valve spindle 7. When selector valve spindle 7 is moved to the left passage 39 is connected across selector valve 20 to passage 23 and thence to the left hand side of cylinder 19, passage 24 remaining open to exhaust through passages 26, 32 and 34. Pressurised fluid entering cylinder 19 through passage 23 acts on piston 1 moving it to the right compressing spring 40 and also causing engagement of a gear through the movement of lever 3. Movement of selector valve spindle 7 to extreme right hand position permits pressurised fluid to enter cylinder 19 through passages 35, 36, 39 and 24 and simultaneously opens the left hand side of cylinder 19 to exhaust through passages 23, 25, 31 and 34, thus causing piston 1 to move to the left compressing spring 41. With selector valve spindle 7 in the central position both sides of cylinder 19 are opened to exhaust and piston 1 is returned to its central position under the action of either spring 40 or 41. Springs 40 and 41 are restrained in the positions shown by sliding cups 42 and inner cups 43 which slide relative to one another to permit compressive movement of the springs but which retain the springs within a certain fitted length at which abutment 44 on outer cup 42 comes into contact with abutment 45 on inner cup 43. These cups are arranged so that in the central positions there is slight axial clearance between piston 1 and sliding cups 42 but in this position springs 40 and 41 have a degree of pre-compression so as to give piston 1 a very positive location in its central position.

When interlock valve spindle 28 is in its right hand position, passages 25, 26 and 39 which normally conduct fluid to and from selector valve 20 are cut off and selector valve 20 is inoperative. In this position of interlock valve spindle 28, passage 35 is connected through port 37 to passage 21 and passage 22 is connected through groove 29, port 46 and throttle valve 33 to exhaust passage 34. Thus the holding system which comprises passages 21 and 22 together with ports 47, 48, 49 and 50 in cylinder 19 is operative. The function of the holding system is to hold gear piston 1 in an "in gear" position when selector valve 20 is rendered inoperative by the action of interlock valve 27.

With interlock valve spindle in its right hand position and gear piston 1 in an "in gear" position, say extreme right of movement, port 47 is uncovered by piston 1 and the left hand side of cylinder 19 is connected to the pressure supply through port 47 and passages 21, 37 and 35; simultaneously port 50 is connected through port 51 in gear shift piston 1 so that the right hand side of cylinder 19 is connected through ports 51, 50 and passages 22, 29 and 46 to exhaust passage 34. Thus gear shift piston 1 will be retained in its right hand position. To ensure that port 51 in piston 1 is in line with port 50 in cylinder 19 a peg in the wall of cylinder 19 rides in an axial slot in piston 1 preventing relative rotation. Similarly, gear shift piston 1 is maintained in the extreme left hand position by flow of pressurised fluid through port 48 and port 49 being simultaneously open to port 52 and permitting exhaust from the left hand side of cylinder 9.

Interlock valve spindle 28 is normally forced into its right hand position by the action of spring 53 acting in conjunction with pressurised fluid acting in space 54 at the left hand end of interlock valve 27. This high pressure fluid enters through passage 55, slot 56 and across clutch valve 10 through passage 57 into space 54, slot 56 is only open to passage 57 when clutch valve spindle 11 is at either of its extreme end positions. In its mid position as shown clutch valve spindle 11 connects passage 57 with port 58 and thence with exhaust passage 18. In this central position and during a gear shifting operation space 54 at the end of valve 27 is opened to exhaust, simultaneously pressurised fluid flows through passages 14 and 13 to space 9 within clutch cylinder 8. As piston 4 moves to the left causing the clutch to disengage against the force of its own pressure springs the pressure of the fluid in space 9 rises progressively. This pressure is applied also to the right hand end of interlock valve spindle 28 by the flow of fluid through passage 59 connecting clutch cylinder 8 with space 60.

The pressure of the fluid common to clutch cylinder space 9 and space 60 rising as the clutch is progressively disengaged eventually reaches a value at which the pre-load of spring 53 is overcome and valve spindle 28 moves to the left. Since the capacity of space 60 is small and the rate of spring 53 is low movement of valve spindle 28 is rapid once the pre-load of spring 53 is overcome. Movement of valve spindle 28 to the left ceases when stop 73 comes against cap 72 and in this position the grooves in valve spindle 28 are opposite ports 31, 36 and 37 thereby permitting flow to selector valve 20 and allowing gear piston 1 to move in accordance with the present position of selector valve spindle 7. As interlock valve spindle 28 passes its mid position passages 21 and 22 are cut off and the holding system is no longer operative.

With this system it is possible that when ports 36 and 39 carrying pressurised fluid to gear shift cylinder 19 are suddenly connected as occurs during rapid movement of valve spindle 28 a sudden drop of pressure occurs in the passages instantaneously connected with the pump outlet. In this event the pressure in space 60 would also fall and valve spindle 28 would move back to the right under the force of spring 53. If this return movement of valve spindle 28 were sufficient passages 25, 26 and 39 leading to selector valve 20 would again be cut off and passages 21 and 22 would be reconnected to the pressurised fluid supply and exhaust through ports 37 and 46. If a slight movement of gear shift pistons from an "in gear" position had taken place during the temporary operation of the selector system this piston would be forced back to the extreme "in gear" position as interlock valve spindle 28 returned to the right re-opening the ports to the holding system. This series of events would create a state of oscillation of valve spindle 28 and gear shift piston 1. To prevent such an occurrence spring loaded ball 61 drops into groove 62 of valve spindle 28 as this spindle crosses its mid position. Spring loaded ball 61 acting against the left hand shoulder of groove 62 produces an axial force on spindle 28 opposing the force exerted by spring 53. The spring loading of ball 61 is adjusted so that valve spindle 28 will not, when moving to right, cross its mid position under the action of spring 53 alone. After the completion of a gear shifting movement clutch valve spindle 11 moves to one or other of its extreme end positions permitting fluid to exhaust from space 9 in clutch cylinder 8 and also from space 60 at the end of interlock valve 27. In this position of valve spindle 11 pressurised fluid is fed into space 54 causing valve spindle 28 to move to the right.

Valve spindle 7, moved axially by rod or cable connection with the manual gear change lever, has three positions corresponding to the left hand "in gear" central (neutral) and right hand "in gear" positions of gear shift piston 1. Spindle 7 is located in each of these three positions by the action of spring loaded ball 63 acting in one of the grooves 64.

Clutch valve spindle 11 is moved by means of a linkage otherwise connected to selector valve spindle 7 and gear shift piston rod 2. Main link 65 is pivotally connected to piston rod 2 through short link 66 and is also pivotally connected to valve spindle 11 through short link 67. Secondary link 69 is pivotally connected to selector valve spindle 7 through short link 70 and is also pivotally connected at pivot 71 to a projection on the main body of the unit. Main link 65 and secondary link 69 are pivotally connected at 68. In Fig. 1, this linkage is shown with both selector valve spindle 7 and gear piston 1 in the neutral (central) positions. Pivot 68 of link 65 is shown in a displaced position to clarify the relative positions of the linkage.

The linkage is arranged such that to initiate a gear shifting sequence valve spindle 11 is moved axially by movement of selector valve spindle 7 to cause pressurised fluid to flow into space 9 of clutch cylinder 8 causing the clutch to disengage. During disengagement of the clutch pressurised fluid acts in space 60 causing interlock valve spindle 28 to move to the left as previously described thus permitting flow of fluid through selector valve 20 to cylinder 19. Subsequent movement of gear shift piston 1 causes further movement of valve spindle 11 through the action of the linkage. The final fraction of movement of gear piston 1 to the extreme right or left hand position causes valve spindle 11 to move over to an extreme end position in which spaces 9 and 60 are opened to exhaust and space 54 is subjected to fluid pressure. Valve spindle 28 is moved from left to right and control of gear piston 1 is transferred from the selector system to the holding system i. e. the gear is virtually locked in position.

Further details of the movement of the linkage are shown in Figs. 2–7 which illustrate the sequence of movements during a gear change.

Figure 2:
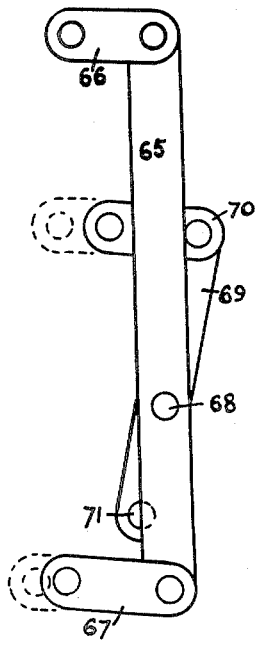
Figs. 2–7 are views of the valve controlling linkage in various significant positions.

In Fig. 2 the linkage is shown with gear piston 1 in the central position (gear in neutral) but with selector valve spindle 7 fully displaced to its right hand position. The movement of link 67 and valve spindle 11 from its central position is indicated, this movement being insufficient to cause a changeover of the flow across clutch valve 10 so that space 9 in clutch cylinder 8 is still subjected to fluid pressure and the clutch remains disengaged. Interlock valve spindle 28 is in the left hand position so that fluid can flow across selector valve 20 to and from cylinder 19 and gear shift piston 1 will start to move.

Figure 3:
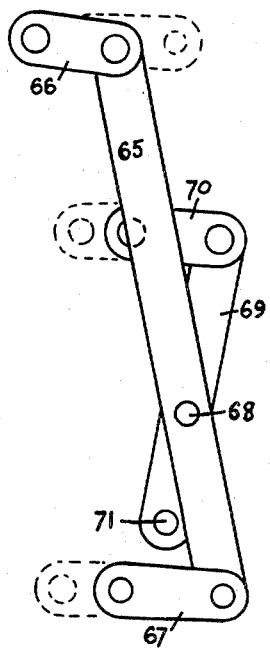

In Fig. 3 gear piston 1 has completed its movement in accordance with the present position of selector valve spindle 7 i. e. piston 1 moves to the left. During this movement link 65 rotates about pivot 68 in link 69 which remains stationary as no further movement of selector valve spindle 7 has occurred. The rotation of link 65 causes further movement of clutch valve spindle 11 to its extreme right hand position in which the changeover of port connection across valve 10 has taken place, thus opening spaces 9 and 60 to exhaust and submitting space 54 to fluid pressure. Piston 4 thus moves to the right under the pressure of the clutch springs and the clutch is re-engaged. Interlock valve spindle 28 also moves over to the right and the holding system operates permitting fluid under pressure to act in the right hand side of cylinder 19 holding piston 1 over to the left against the force of spring 41.

Figure 4:
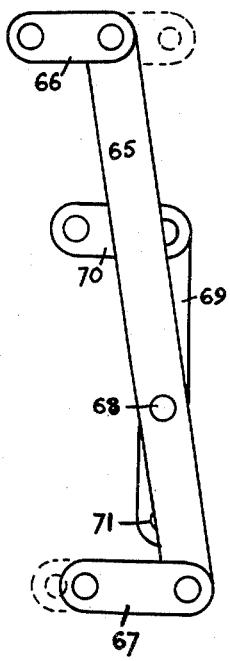

In Fig. 4 selector valve spindle has been returned to the neutral position with piston 1 temporarily still at the left hand limit of its stroke. Valve spindle 11 is then displaced from its end position sufficiently to cover clutch exhaust port 16 and connect pressure supply passage 14 with transfer passage 13 thus causing the clutch to disengage. Simultaneously the pressure in space 54 at the left end of valve 27 is released and valve spindle 28 moves to the left as the pressure on clutch pistons 4 rises. In the central position of selector valve spindle 7 both ends of gear cylinder 19 are connected with exhaust port 34. Gear piston 1 will thus be returned to its central position by the action of spring 41.

Figure 5:
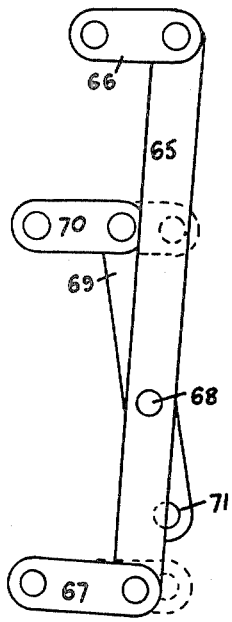
Figure 6:
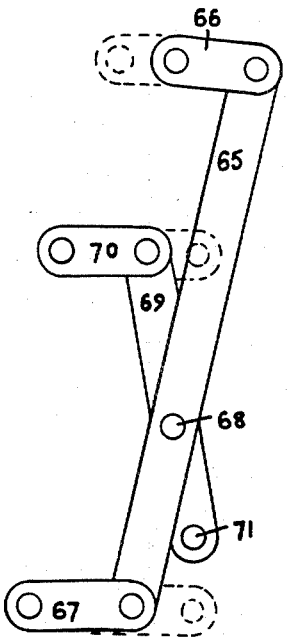
Figure 7:
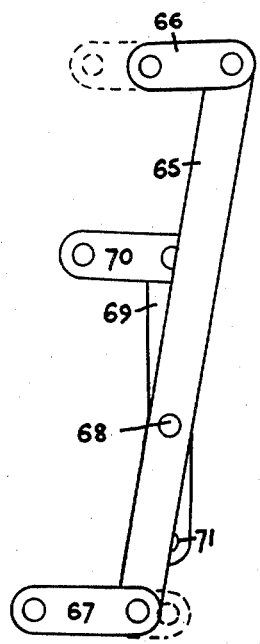

Figs. 5, 6 and 7 show the corresponding positions of the linkage for the selection of the alternative (right hand) "in gear" position of piston 1 from neutral, the subsequent "in gear" position of piston 1, and the selection of neutral from this "in gear" position respectively.

To initiate a shift from the gear engaged by lever 3 with gear piston 1 in its left position to the gear engaged with gear piston 1 in its right position selector valve spindle 7 controlled manually as previously described may be moved straight across from one end position to the other end without hesitation in neutral; the correct sequence of operation of clutch and gear shift will then follow.

The system is arranged so that the selector mechanism only operates (i. e. movement of gear piston 1 only occurs) when the pressure in clutch cylinder 8 is sufficient to force interlock valve spindle 28 across to the left against the compression of spring 53. The fitted length of spring 53 can be altered by adjustment of screwed cap 72 so that the critical fluid pressure initiating movement of valve spindle 28 can be arranged to correspond with that pressure acting in cylinder 8 against clutch piston 4 which causes the optimum degree of disengagement of the clutch for gear shifting. Throttle valves 17 and 33 in the exhaust passages are also adjustable to give desirable rates of re-engagement of the clutch and of meshing of gear during the shifting operation.

The linkage shown in Figs. 1–7 is arranged such that the clutch is only permitted to engage when both selector valve spindle 7 and gear piston 1 are fully home in an "in gear" position. An alternative form of linkage which permits engagement of the clutch also in neutral (with valve spindle 7 and piston 1 both in the mid position) may be used in conjunction with a modified clutch valve.

Figure 8:
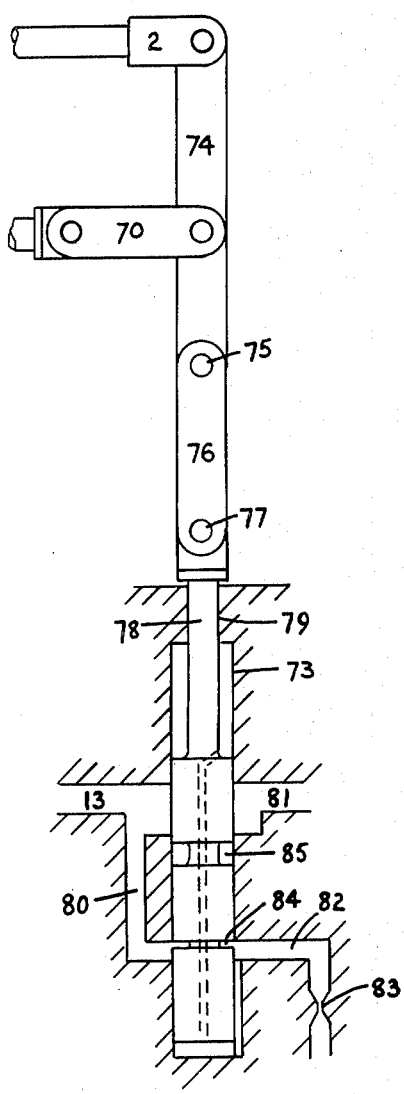
Fig. 8 is a diagrammatic representation of an alternative arrangement of the linkage and clutch controlling valve.

This alternative form of the linkage and clutch valve is shown in Fig. 8. In this case the pressure feed to the left hand end of interlock valve 27 is dispensed with together with spring loaded ball 61 and slot 62. Interlock valve spindle 28 is acted on only by the force of spring 53 and pressurised fluid acting in space 60 when the clutch is disengaged. The system must then incorporate sufficient fluid damping to prevent oscillation of valve spindle 28 and gear piston 1 as described previously.

Otherwise the remainder of valve 10 together with the linkage in Fig. 1 are replaced by clutch valve 73 and the linkage shown in Fig. 8. In this linkage gear shift piston rod 2 is pivotally connected to main link 74 which is also pivotally connected through short link 70 to selector valve spindle 7. Toggle link 76 is pivotally connected to main link 74 at 75 and is also connected to clutch valve spindle 78 at 77. To take side thrusts from the linkage valve spindle 78 slides through an area of bearing surface at 79. In the position shown in Fig. 8 in which both selector valve spindle 7 and gear piston 1 are in the central (neutral) position valve spindle 78 is at the bottom of its stroke and passage 13 leading to space 9 in clutch cylinder 8 is open to exhaust through passage 80 groove 84, passage 82 and throttle valve 83. The supply of pressurised fluid through 81 is cut off at valve spindle 78. Thus in neutral gear the clutch is permitted to engage.

Figure 9:
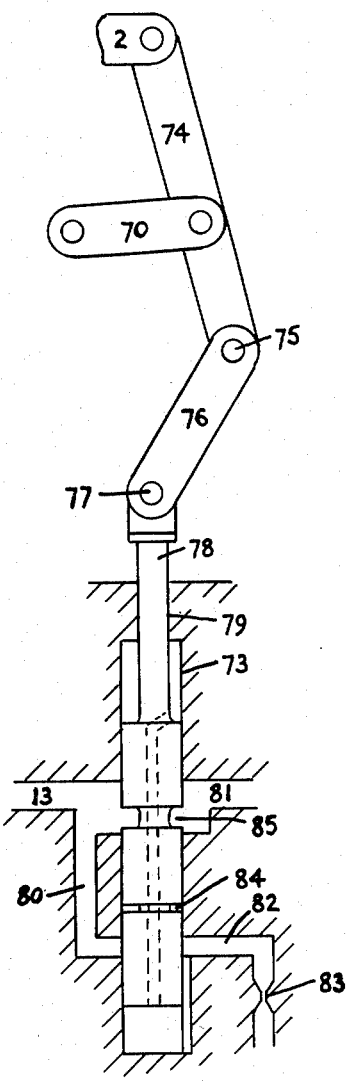

In Fig. 9 the position of the linkage is shown with selector valve spindle 7 and therefore link 70 displaced fully to the right with gear piston 1 and piston rod 2 still in the central position. Through the action of the linkage valve spindle 78 is raised from its bottom position so that slot 84 moves out of line with the ports in passages 80 and 82 and slot 85 simultaneously connects passage 81 carrying pressurised fluid to passage 13 leading to clutch cylinder 9. In this position the clutch disengages and the selector system functions after movement of interlock valve spindle 28 as described previously.

In Fig. 10 gear piston 1 has completed its movement to the left hand "in gear" position and rotation of main link 74 and link 70 about pivots 75 has caused further upward movement of valve spindle 78 such that passage 13 is isolated from passage 81 and is instead connected to exhaust passage 82 through passage 80 and below the bottom face of valve spindle 78. In this position clutch engagement again takes place permitting the drive to be taken up in gear.

In Fig. 11 selector valve spindle 7 has been moved back to its central position with gear piston 1 still in its extreme left position. The corresponding movement of valve spindle 78 re-opens the supply of pressurised fluid to clutch cylinder 8 and cuts off the exhaust thus causing the clutch to disengage and initiate the sequence leading to movement of the gear piston 1 and subsequent re-engagement of the clutch when gear piston 1 has completed its movement, in this case to the central position.

A feature of this system is that the sequence and timing of gear shifts and clutch operation is independent of the rate of movement of the manual control lever on the steering column. To effect a gear change this lever can be moved rapidly from one position to another. If, however, the particular gear shift requires a different selector rod within the gearbox to be engaged and shifted a pre-selection arrangement will be necessary unless the movement of the gear piston is temporarily held in the neutral position. Such a pre-selection arrangement for engaging the appropriate selector rod could consist of a pre-tensioned spring device incorporated in the connection between the up and down movement of a manual change speed lever mounted on the steering column and the movement of a selector fork. Rapid movement of this change speed lever into the different gear positions would then pre-tension this spring device so as to cause engagement in the appropriate selector rod as the gear piston moved through the neutral position the actual motion of the gear piston being initiated as indicated above by movement of the selector valve spindle.

A further feature of this invention relates to the ability to arrange all the parts of the mechanism in a single unit which could be adapted to bolt on to the side cover of a normal gearbox. In such an installation the passages carrying pressurized fluid to the unit (passages 14, 35, and 55 in Fig. 1) would be connected to a common passage leading from the pump outlet. In a similar manner the exhaust passages 34 and 18 would enter a common passage return fluid at low pressure to a reservoir in the form of a pump.

For engaging and disengaging the drive during starting from rest or stopping the vehicle it would be necessary to incorporate a fluid coupling in the power drive or provide other means for operation of the clutch under these conditions. Such a system controlling hydraulic pressure could be used in conjunction with this invention by adding an auxiliary piston in the clutch cylinder. A piston of this type is shown in Fig. 1 at 86. A separate fluid feed to this piston would enter through port 87 leading to space 88 in cylinder 8. Piston 86 is located in piston 4 by spigot 89 but the two pistons have free axial movement relative to each other. When space 88 is filled with pressurized fluid piston 86 will move to the left causing piston 4 also to move to the left and thereby disengage the clutch if chamber 9 is not pressurized. Otherwise the operation of piston 4 within cylinder 8 is unaffected.

Having fully described our invention, what we claim and desire to secure by Letters Patent is:

1. Hydraulically operated friction-clutch and gear change mechanism for automobiles comprising a source of fluid pressure, a fluid pressure cylinder, a double-acting piston movable in said cylinder to actuate gearshift mechanism, a manually movable selector valve for controlling the flow of fluid pressure to or from one side or the other of said piston, an axially movable interlock valve normally blocking flow of fluid pressure to said selector valve, resilient means acting on one end of said interlock valve to releasably retain it in its normal position, a clutch operating cylinder and piston, the latter being normally urged to clutch engaged position, a clutch valve for controlling flow of fluid pressure to or from said clutch operating cylinder, and means for conducting fluid pressure from said clutch operating cylinder to the opposite end of said interlock valve to move the same against said resilient means to a position admitting fluid pressure to said selector valve when the pressure in said clutch operating cylinder has risen to a point sufficient to substantially disengage said clutch.

2. The hydraulically operated friction-clutch and gear change mechanism of claim 1 comprising in addition means responsive to movement of said double acting piston into gear change position for moving said clutch valve to a position exhausting fluid pressure from said clutch operating piston.

3. The hydraulically operated friction-clutch and gear change mechanism of claim 1 wherein said clutch valve is normally closed with said clutch normally engaged and having means responsive to initial movement of said selector valve to move said clutch valve to open position for disengagement of said clutch.

4. The hydraulically operated friction-clutch and gear change mechanism of claim 1 and including fluid pressure holding lines for conducting fluid pressure to ports in said gearshift cylinder upon return of said interlock valve to normal position, and valve means controlled by movement of said gearshift piston to gearshift position for admitting holding fluid pressure to the pressure side of said gearshift piston.

5. Hydraulically operated friction clutch and gear change mechanism according to claim 1 wherein said selector valve is manually movable from between alternative gearshift control positions and a neutral position and said clutch valve is movable between an open position and an exhaust position, a linkage system connected to said clutch valve and actuated by said selector valve upon movement thereof from a gearshift control position to any other position to move said clutch valve to open position, and a second linkage connected to said first linkage and actuated by said gearshift piston to move said clutch valve to exhaust position upon movement of said gearshift piston into extreme gearshift position.

6. The hydraulically operated friction-clutch and gear change mechanism in accordance with claim 3 wherein said gear change piston valve and said selector valve have neutral positions, a linkage system interconnecting the gear change piston, selector valve, and clutch valve, said linkage system operating to retain said clutch valve in closed position and said clutch engaged when said gear change piston and said selector valve are in neutral position and operable by movement of said selector valve to move said clutch valve to open position for disengaging the clutch upon initial movement of said selector valve.

References Cited in the file of this patent
UNITED STATES PATENTS

| | | |
|---|---|---|
| 1,916,891 | Padgett | July 4, 1933 |
| 2,073,692 | Griswold | Mar. 16, 1937 |
| 2,074,476 | Kolb | Mar. 23, 1937 |
| 2,104,061 | Surdy | Jan. 4, 1938 |
| 2,153,509 | Rockwell | Apr. 4, 1939 |
| 2,185,730 | Griswold | Jan. 2, 1940 |
| 2,233,790 | Linsley | Mar. 4, 1941 |
| 2,622,711 | Chambonneau | Dec. 23, 1952 |
| 2,631,700 | Long et al. | Mar. 17, 1953 |